Oct. 22, 1974   B. LICHTENSTENEN   3,843,326
METHOD AND APPARATUS FOR SUCCESSIVE SAMPLE ANALYSIS
WITHOUT INTER-SAMPLE CONTAMINATION
Filed June 7, 1972                                7 Sheets-Sheet 1

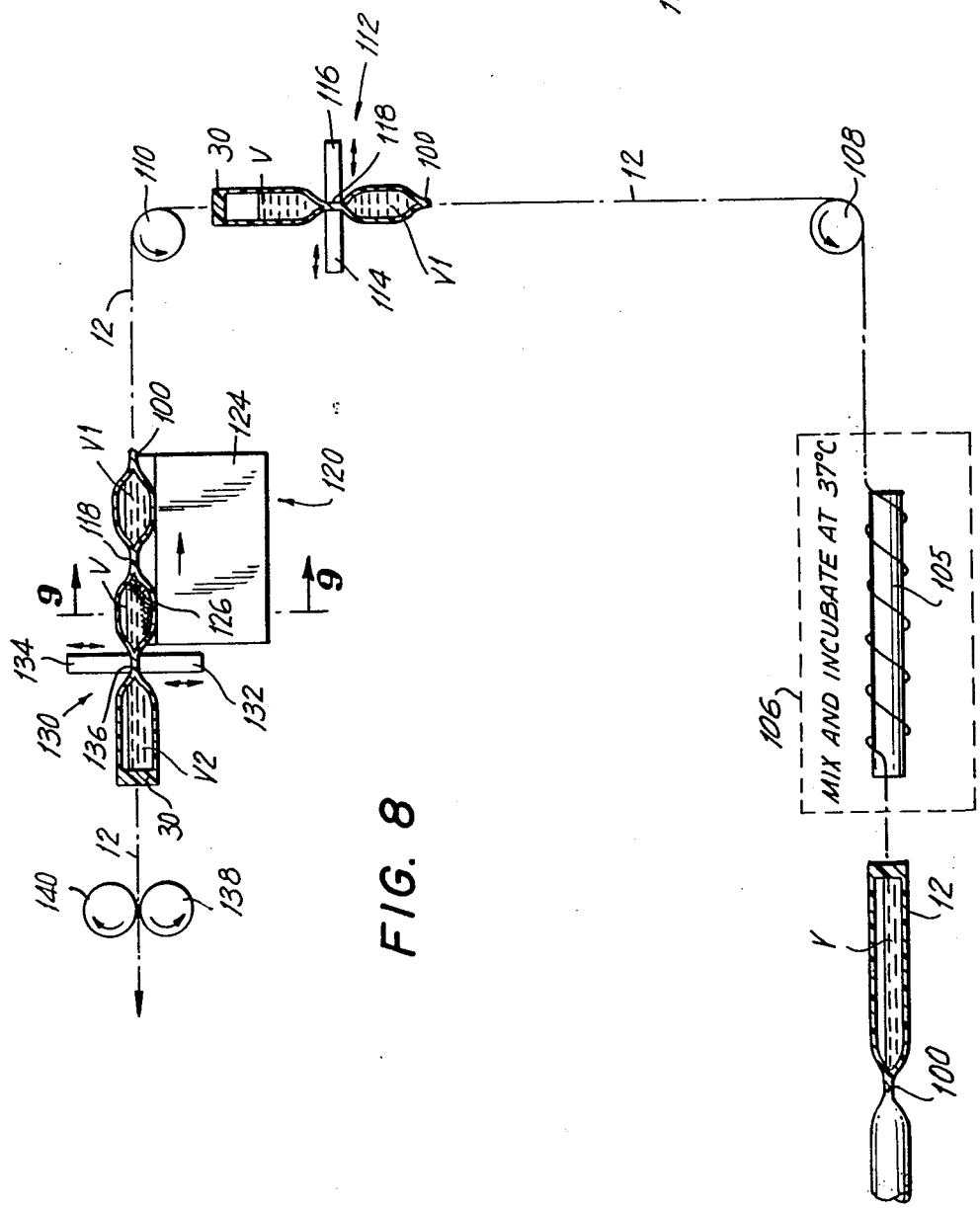

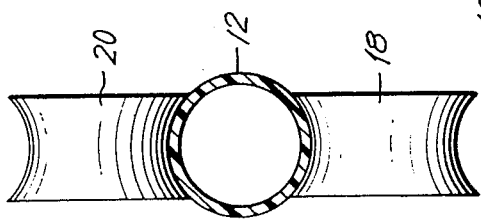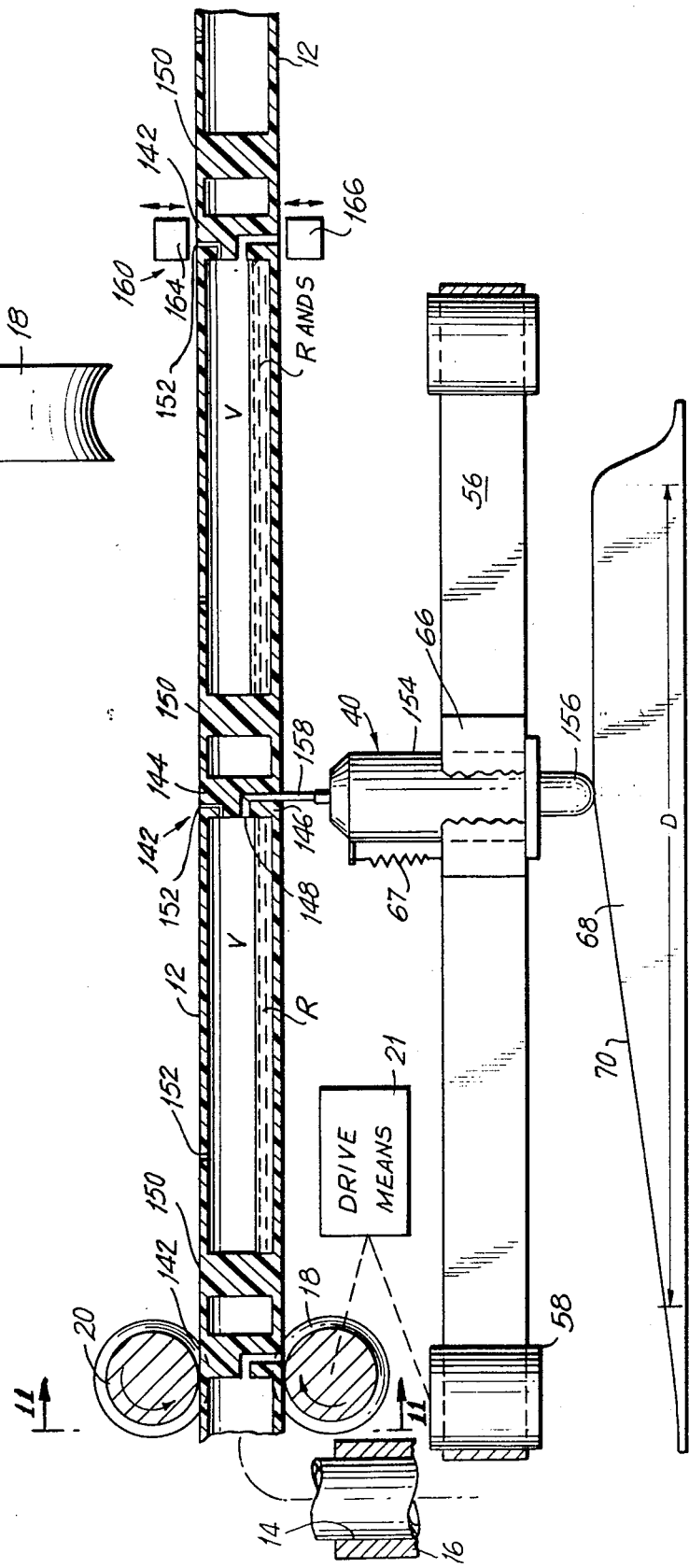

United States Patent Office 3,843,326
Patented Oct. 22, 1974

3,843,326
METHOD AND APPARATUS FOR SUCCESSIVE SAMPLE ANALYSIS WITHOUT INTER-SAMPLE CONTAMINATION
Bernard Lichtenstein, Yorktown Heights, N.Y., assignor to Technicon Instruments Corporation, Tarrytown, N.Y.
Filed June 7, 1972, Ser. No. 260,549
Int. Cl. B65b 1/04, 3/04; G01n 31/00
U.S. Cl. 23—259    4 Claims

ABSTRACT OF THE DISCLOSURE

Method and apparatus for the sterile, successive, automatic treatment and analysis of a series of samples without inter-sample contamination comprise the utilization of elongated tubing as sample transport and treatment means through the formation of spaced, sealed, sterile volumes in said elongated tubing which are isolated, each from the other, and the introduction of predetermined sample and reagent quantities into each of said tubing volumes.

BACKGROUND OF THE INVENTION

(1) Field of the invention

This invention relates to new and improved method and apparatus for automatic, successive sample treatment and analysis without inter-sample contamination.

(2) Description of the prior art

Although a variety of systems are currently available and operate in satisfactory manner for the automatic successive treatment and analysis of a series of samples on a continuous flow basis, it may be understood that a problem of inter-sample contamination arises in the operation of such systems despite the physical separation of the samples and the utilization therein of a wash liquid or like cycle between samples. In the operation of such systems, which utilize one or more tubes to provide a flow path for a series of samples and subsequently formed sample-reagent mixtures which are separated by separating fluid segments and are pumped through said tube or tubes as a continuous stream or streams, some residue of a sample and/or sample-reagent mixture will, of course, cling to the interior walls of the tube in question and, despite the combined cleansing action of the separating fluid segment and the wash liquid segment, may not be totally removed from said interior tube walls with resultant contamination thereby of the succeeding sample and attendant possibility of inaccuracy in sample analysis results. In addition, such systems generally rely upon the use of peristaltic pump means or the like and precise calibration of the pump tubes and flow system tubes to provide for the requisite exact reagent and sample flow stream phasing to thereby introduce another possible source of system inaccuracy. Too, the speed of operation of said systems in terms of sample analyses per unit time is, of course, limited by the flow rates which may be practically achieved in the provided pump and flow network tubes. Also, since the sample-reagent mixtures of interest exist only as spaced segments of a continuous stream or streams, care must be taken to assure the requisite, absolutely correct sample identification, and that discrete retention of said sample-reagent mixtures for later re-evaluation or further study is rendered difficult.

OBJECTS OF THE INVENTION

It is, accordingly, an object of this invention to provide new and improved method and apparatus for automatic, successive sample treatment and analysis without inter-sample contamination.

Another object of this invention is the provision of method and apparatus which eliminate inter-sample contamination without requiring the provision of inter-sample separating fluid segments or inter-sample wash liquid segments or the like.

Another object of this invention is the provision of method and apparatus which eliminate the need for sample pump means and precise apparatus flow network phasing and calibration.

A further object of the invention is the provision of method and apparatus in which exact sample identification and retention of a treated sample for re-evaluation or the like are rendered particularly convenient.

SUMMARY OF THE INVENTION

As disclosed herein, the method and apparatus of the invention comprise the use of a continuous length of tubing which is utilized as sample transport means. A sample treatment cycle in initiated by the sealing of said tubing and the advancement thereof beyond tubing closure means to create an expanding tubing volume between said seal and said closure means. Concomitantly, a predetermined sample quantity from a sample container is injected into said tubing volume through said seal and drawn into the former. At the completion of sample injection, a predetermined quantity of reagent from a reagent container is injected into said tubing volume through a different portion of said seal and drawn into said expanding tubing volume to mix with said sample therewithin. Following this, a predetermined quantity of sterile air is drawn into said expanding tubing volume to provide a mixture of precisely predetermined portions of sample, reagent and air within said volume.

At the completion of air injection, tubing advancement is discontinued. The tubing is re-sealed at said seal to close the sample and reagent injection punctures sealed at said closure means to provide a sealed tubing volume extending therebetween and containing the sample-reagent-air mixture of interest for subsequent treatment and analysis.

Operation is continuous, as described, with each sample being injected into and mixed with the reagent and air in a different, sealed tubing volume formed in said tubing length.

Of particular advantage is the fact that each of said sealed tubing volumes is formed independently of the others, and that each of said samples comes into contact with the relevant tubing volume, only, whereby inter-sample contamination is eliminated.

In another disclosed embodiment of the invention, the tubing seals are pre-formed and the sample and reagent quantities are pumped into the tubing volumes through punctures in said seals, following which the latter are re-sealed.

DESCRIPTION OF THE DRAWINGS

The above and other objects and advantages of this invention are believed made clear by the following detailed description thereof taken in conjunction with the accompanying drawings wherein:

FIG. 1 is a top view of the tube transport and sealing portion of the apparatus of the invention with other parts omitted;

FIG. 2 is a partially schematic longitudinal cross-sectional view taken through portions of the tube transport and sample supply means of the invention;

FIG. 8 is a generally schematica diagram illustrating the application of the method and apparatus of the invention to the separation of the lymphocytes from a series of whole blood samples on a continuous flow basis;

FIG. 9 is a cross-sectional view taken along line 9—9 in FIG. 8;

FIG. 10 is a partially schematic longitudinal cross-sectional view taken through portions of the tube transport and sample and reagent supply means of another embodiment of the invention.

FIG. 11 is a cross-sectional view taken through line 11—11 in FIG. 10;

DETAILED DESCRIPTION OF THE INVENTION

Figure 3:
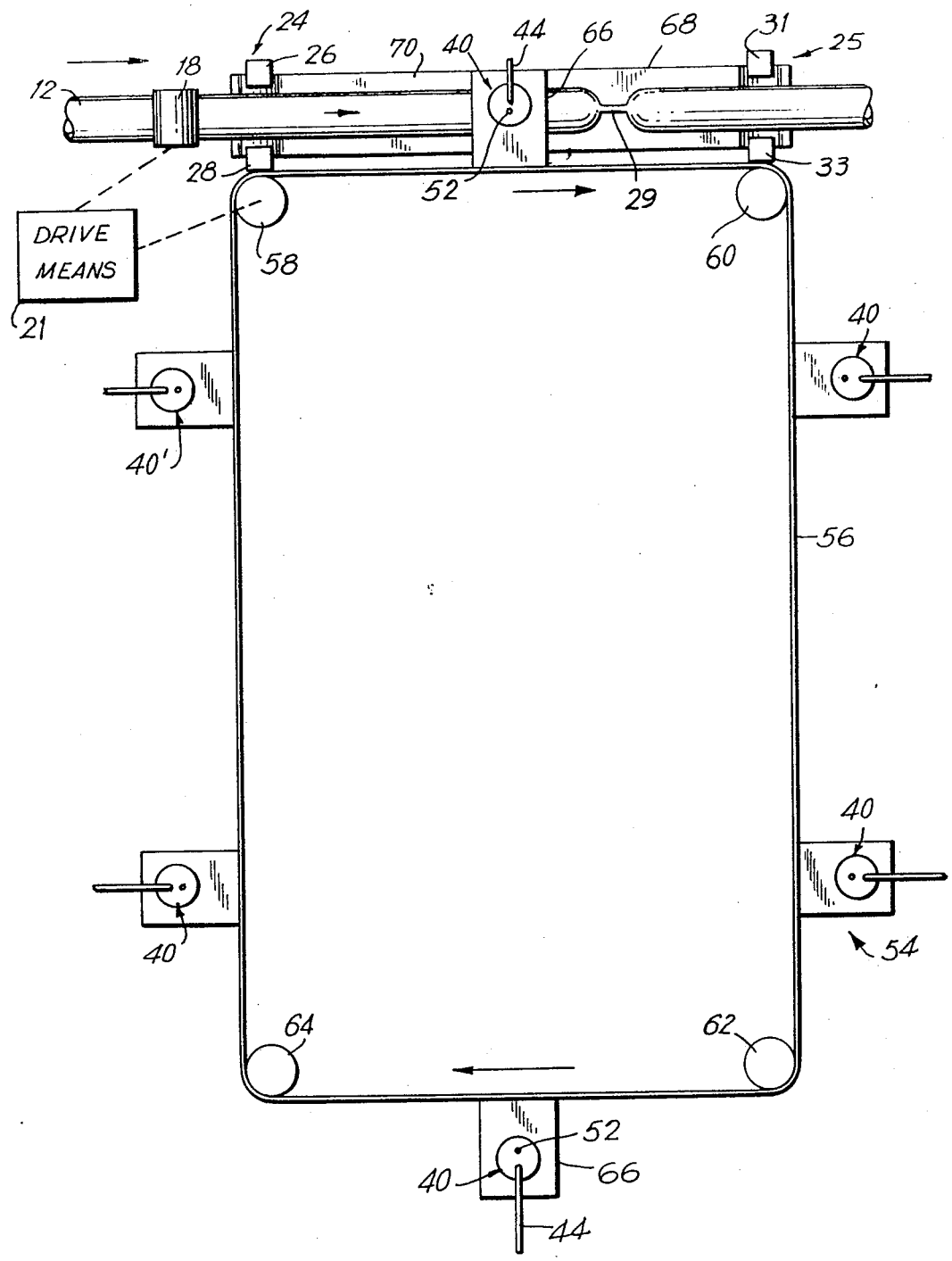
FIG. 3 is a partially schematic top view of the tube transport and sample supply means of the invention with other parts omitted.

Referring now to FIGS. 1 and 2, sample transport means are indicated generally at 10, and comprise continuous tubing 12 of any suitably resilient, substantially inert and readily heat sealable or thermoplastic material, for example, of polyvinyl, chloride (PVC). A supply of the tubing 12 is indicated at 14 and is preferably presterilized to prevent sample contamination. The tubing 14 is disposed as shown in a clean air chamber 16. The non-illustrated supply roll end of the tubing 14 is left open to atmosphere to provide for the ready exhaust of air therefrom for purposes described in detail hereinbelow.

Tubing drive and idler rollers are indicated at 18 and 20, respectively, and drive roller 18 is driven in the clockwise direction by drive means 21 to advance the tubing 12 from left to right as seen in FIGS. 1 and 2. The drive rollers 18 and 20 are respectively spaced and dimensioned so that a temporary fluid-tight seal will be formed as indicated at 22 by the relevant tubing wall portions concomitant with the advancement of the tubing between said rollers. Said drive rollers are also readily energizable, as by the application of RF energy thereto, from a non-illustrated RF energy source, to function as sealing electrodes to rapidly and permanently seal the tubing 12 therebetween as and when desired.

Tubing sealing means are indicated generally at 24 and 25 in FIG. 1. Said sealing means 24 are positioned as shown substantially adjacent the drive rollers 18 and 20 in the direction of travel of the tubing 12 and preferably comprise spaced sealing jaws 26 and 28 taking the form of RF energizable sealing electrodes which are moveable as indicated into contact with the tubing 12, and are energizable by the application of RF energy thereto, to rapidly and efficiently heat-seal the tubing through the formation therein of the three-section seal 29. The seal 29 comprises spaced seal areas 30, 32 and 34, having generally "L" shaped passages 36 and 38 extending therebetween. Preferably, one of the sealing jaws 26 and 28 further includes means to emboss a different sample identification number or like indicia on the exterior of one of said seal sections. In like manner, the sealing means 25 preferably comprise RF energizable sealing electrodes 31 and 33 which are movable as indicated in FIG. 1 into contact with the seal 29 to subsequently seal the passages 36 and 38 for purposes described in detail hereinbelow.

A sample container is indicated generally at 40 and comprises a fluid-tight stopper 42 having an air inlet conduit 44 extending therethrough as shown. A valve 46 and bacteria filter 48 are interposed in the air inlet conduit 44. The valve 46 is automatically operable as desired under the control, for example, of a solenoid 47 which is in turn controlled as indicated from appropriately programmed non-illustrated valve-operating solenoid control means. A sample outlet conduit is indicated at 50 and also extends as shown through stopper 42 to terminate in a hypodermic needle 52.

Sample container supply means are indicated generally at 54 in FIGS. 2 and 3 and comprise a flexible, endless sample container support member 56, which may, for example, take the form of a belt or mesh chain or the like. A drive roller or drive sprocket is indicated at 58, and idler rollers or idler sprockets are indicated at 60, 62 and 64, respectively. The drive roller or sprocket 58 is driven in the clockwise direction from the drive means 21 in synchronism with the drive of tubing drive roller 18, to advance the sample container support member 56 in the clockwise direction at substantially the same speed as the speed of advancement of the tubing 12.

Sample container support collars are indicated at 66 and are fixedly secured to the periphery of the container support member 56 as shown at substantially equally spaced points thereon. A sample container 40 is operatively disposed in each of said sample container support collars with freedom for longitudinal, or as here up and down, movement relative thereto. Biasing means taking the form of a tension spring 67 are operatively associated as shown with each of the sample containers 40 and support collars 66 and are operable to bias the former downwardly in the latter. For a typical utilization of the apparatus of the invention, each of said sample containers will contain substantially the same predetermined quanity of a different sample in the nature, for example, of a blood sample.

A sample container drive cam is indicated at 68 and is stationarily disposed as shown below one race of the endless sample container support member 56 in substantial longitudinal alignment therewith and with the tubing 12. The cam 68 comprises an operative surface 70 which, as seen in FIG. 2, rises abruptly from a lower level to a higher level, remains at said higher level for substantially a distance D, as shown in FIG. 4, and abruptly falls to return to said lower level.

Figure 4:
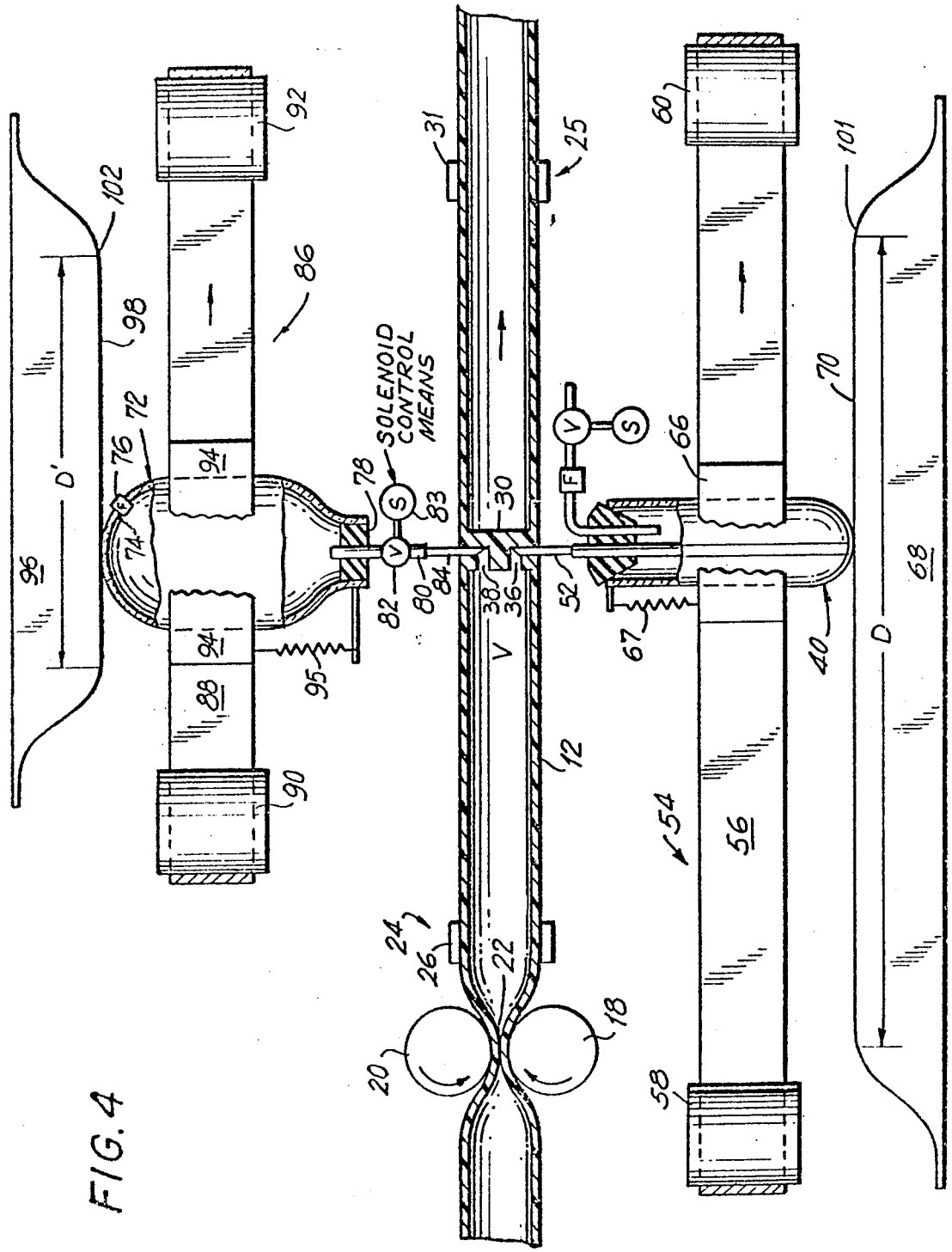
FIG. 4 is a partially schematic longitudinal cross-sectional view taken through the sample and reagent supply means and the tubing transport and sealing means of the invention.

A reagent container is indicated generally at 72 in FIG. 4 and comprises an air inlet having a bacteria filter 76 operatively disposed therein. A stopper is indicated at 78 and a reagent outlet conduit 80, having a valve 82 operatively interposed therein, extends as shown through stopper 78. The reagent outlet conduit 80 terminates as shown in a hypodermic needle 84. The valve 82 is automatically operable as desired under the control, for example, of a solenoid 83 which is in turn controlled as indicated from the same appropriately programed, non-illustrated valve-operating solenoid control means as control the solenoid 47 of FIG. 2.

Figure 5:
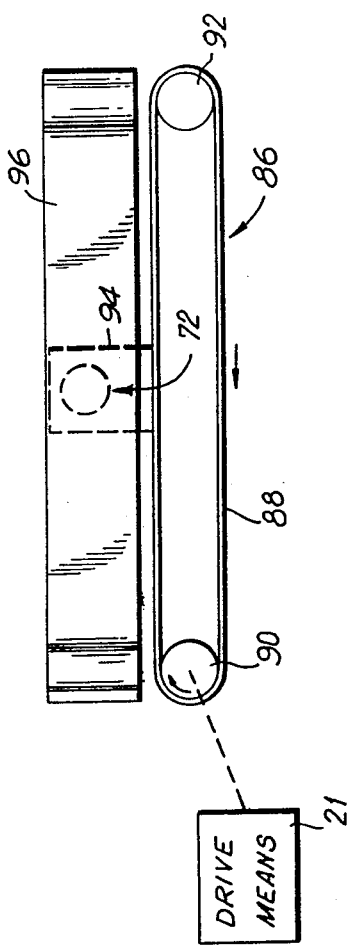
FIG. 5 is a partially schematic top view of the reagent supply means of the invention.

Reagent container supply means are indicated generally at 86 in FIG. 5 and comprise a flexible reagent container support member 88 taking the form of the sample container support member 56. A drive roller or drive sprocket is indicated at 90 and an idler roller or idler sprocket is indicated at 92. The drive roller or sprocket 90 is driven in the clockwise direction from the drive means 21, in synchronism with the drive of tube drive roller 18 and sample container support means drive roller or sprocket 58 to advance the reagent container support member 88 in the counterclockwise direction at substantially the same speed of advancement of the tubing 12 and the sample container support means 56.

A reagent container support collar is indicated at 94 and is fixedly secured to the periphery of the container support member 88. The reagent container 72 is operatively disposed in said support collar with freedom for longitudinal, or again as here up and down, movement relative thereto. Biasing means taking the form of a tension spring 95 are operatively connected as shown in FIG. 4 to the reagent container 72 and collar 94 to bias the former upwardly with regard to the latter.

A reagent container drive cam is indicated at 96 in FIG. 4 and is stationarily disposed as shown above one race of the endless reagent container support member 88 in substantial longitudinal alignment therewith and with the tube 12. The cam 96 comprises an operative surface 98 which falls abruptly from a higher level to a lower level, remains at said lower level for substantially a distance D', and abruptly rises to return to said higher level.

In operation, under steady state conditions, for the automatic successive introduction of like or equal quantities of the different samples from the respective sample containers 40 into substantially equally spaced and dimensioned successive portions of the tubing 12, and the introduction of like or equal quantities of reagent and air into each of said tubing portions and the subsequent sealing thereof to form successive, sterile sealed spaced tubing portions each containing predetermined quantities of reagent, air and a different sample, it may be understood that the tubing 12 would be advanced through driven rotation of drive roller 18 by drive means 21 to the position thereof depicted in FIG. 1 whereupon rotation of said drive roller would be discontinued to momentarily discontinue tubing advancement. The air compressed within the tubing 12 by such advancement would, of course, be free to escape from the remote, supply roll end of the tubing which is left open to atmosphere as described hereinabove.

With the tubing 12 positioned as depicted in FIG. 1, it may be understood that the sealing jaws 26 and 28 would be advanced into the depicted operative position thereof and energized by the application of RF energy thereto to seal the tubing through the formation of the three section seal 29. At the completion of the formation of said seal the application of the RF energy to said sealing jaws would be discontinued, but the same would be maintained in the advanced position thereof to grasp the tubing 12 firmly therebetween to support the same. As this occurs, the driven advancement of the sample container support means 56 will be commenced and will be effective to bring the bottom of a sample container 40 (FIG. 2) into contact with the operative surface 70 of the sample container drive cam 68 whereby said sample container will abruptly be driven upward to cause the sample outlet conduit hypodermic needle 52 to puncture the lower wall portion of the tube 12 and travel inwardly through the tube seal passage 36 intermediate the tube seal sections 30 and 34 substantially to the position thereof depicted in FIG. 2. Just as said hypodermic needle commences the puncture of the lower tube wall portion as described, it may be understood that the sealing jaws 26 and 28 will be very rapidly withdrawn and the driven rotation of the drive roller 18 again started to thereby commence concomitant advancement of the tubing 12 and the relevant sample container 40 at the same rate with the hypodermic needle 52 now operatively positioned within seal passage 36. At this point, valve 46 is automatically opened.

This concomitant advancement of the tubing 12 and the sample container 40 will be effective to cause the sample from the latter to be sucked into the constantly expanding volume V of the tube portion which extends between the seal 29 and the tube portion which is gripped between the rollers 18 and 20 to form the seal as indicated at 22. The volume of the sample container 40 which is evacuated by the withdrawal of the sample therefrom as described into the tubing volume V is, of course, replenished by the bacteria-free air which is drawn into said sample container through air inlet conduit 44 and the open valve 46.

Concomitant tube and sample container advancement will continue as described until the same have assumed substantially the positions depicted in FIG. 4 to complete the withdrawal of all of the sample from sample container 40 into the tubing volume V, whereupon advancement of the tubing 12 and the sample container 40 are concomitantly discontinued through discontinuance of the drive of the respective drive rollers 18 and 58. Of course, the distance through which the sample container moves from the position thereof depicted in FIG. 2 to the position thereof depicted in FIG. 4 is precisely determined in accordance with the concomitant increase in the tubing volume V to be just sufficient to withdraw all of the sample from said sample container into said tubing volume.

With the tubing 12 and sample container stopped and substantially in the position depicted in FIG. 4, it may be understood that the sample container air inlet conduit valve 46 will be automatically closed, and the reagent container 72 will be advanced by reagent container support means 88 to the position thereof wherein the top of said reagent container commences to contact the operative surface 98 of the reagent container drive cam 96. As this occurs, said reagent container will be forced abruptly downward with resultant puncture of the upper tube wall portion by the reagent outlet conduit hypodermic needle 84 and extension thereof into the seal passage 38 which extends between seal sections 30 and 32. Said reagent outlet conduit hypodermic needle will extend as shown only part-way into the generally vertical portion of the "L" shaped seal passage 38 to thus substantially inhibit the possibility of any contact between the tip of said hypodermic needle and the sample volume now in the tube volume V to prevent contamination of said hypodermic needle tip by said sample volume.

Immediately upon the puncture as described of the upper tube wall portion by the reagent outlet conduit hypodermic needle 84, the reagent container outlet conduit valve 82 will be automatically opened, and the driven rotation of drive rollers 18, 58 and 90 will be commenced to begin the concomitant advancement of the tubing 12, the reagent container 72 and the sample container 40, respectively, at the same rate. As this occurs with resultant further expansion of the tubing section volume V, it may be understood that the reagent will be withdrawn from the reagent container 72 for flow through the reagent outlet conduit 80, the open valve 82, and the reagent outlet conduit hypodermic needle 84 into the again expanding tubing section volume V for mixture therewithin the previously withdrawn sample volume V. The volume of the reagent container which is evacuated by this reagent withdrawal will, of course, be replenished by bacteria-free air which is drawn thereinto through air inlet 74 and bacteria filter 76, while the further withdrawal of any sample which may remain in the sample container 40 will, of course, be prevented by the closure of the air inlet conduit valve 46.

Concomitant advancement of the tubing 12, the reagent container 72 and the sample container 40 as described will continue until said reagent container and tubing have been advanced through a distance which is effective to result in the withdrawal of a precisely predetermined reagent volume from said container into the expanding tubing section volume V. As this occurs, the reagent outlet conduit valve 82 will be automatically closed to discontinue reagent withdrawal and the sample container air inlet valve 46 automatically opened to thereby commence the sucking of air into the still expanding tubing section volume V through air inlet conduit 44, the valve 46, the sample container 40, the sample container outlet conduit 50 and the sample container outlet conduit hypodermic needle 52, respectively. Concomitant advancement of the tubing 12, the reagent container 72, and the sample container 40 is continued under these conditions for a distance which is effective to result in the sucking of a precisely predetermined volume of air into the tubing section volume V of interest.

Immediately upon the completion of the provision of this predetermined volume of air and the mixture thereof with the provided sample and reagent volumes within the tubing section volume V, the sample and reagent containers 40 and 72 will have been advanced to the vertically aligned, abrupt drop-off points 101 and 102 (FIG. 4) of the respective cam operating surfaces 70 and 98, whereupon continued container advancement will result in the abrupt downward movement of the sample container 40 under the influence of biasing means 67 with attendant abrupt withdrawal of sample injection hypodermic needle 52 from seal passage 38, and concomitant abrupt upward movement of the reagent container 72 under the influence of biasing means 95 with attendant abrupt withdrawal of reagent injection hypodermic needle 84 from seal passage 38.

Figure 6:
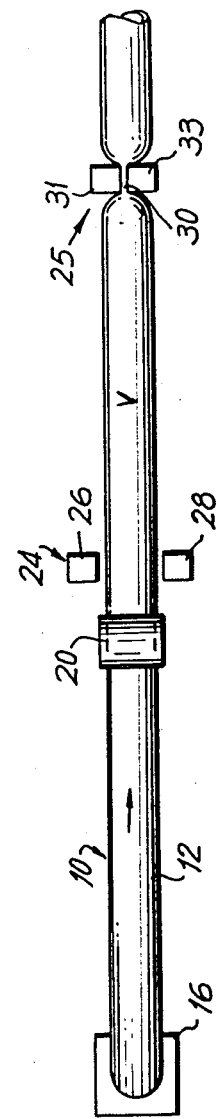
FIG. 6 is a top view of the tubing transport and sealing means of the invention upon completion of one operational cycle.

Following this, and with the tubing section volume V substantially in the position depicted in FIG. 6, driven rotation of the drive roller 18 is discontinued to stop tubing advancement, whereupon the sealing jaws 31 and 33 are moved as shown into contact with the seal 30 and activated by the application of RF energy thereto to complete said seal by closing off the respective seal passages 36 and 38, it being understood that the damming effect of the seal portion 34 will have substantially prevented the leakage of any of the sample-reagent mixture from the tubing volume V in the very short time period elapsed since the abrupt removal of the sample injection hypodermic needle from seal passage 36.

Figure 7:
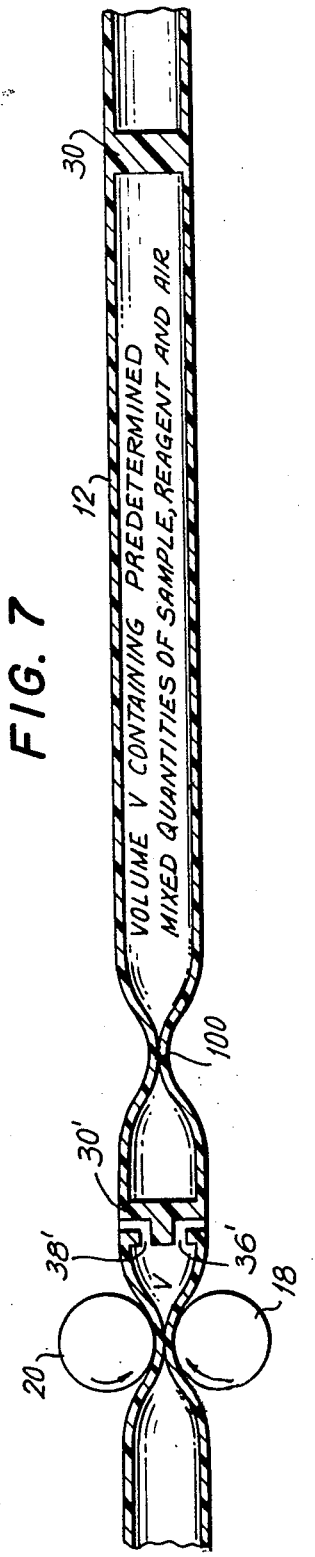
FIG. 7 is a longitudinal cross-sectional view illustrating a sealed tubing volume containing a sample-reagent-air mixture.

Concomitantly with the movement and activation as described of the sealing jaws 31 and 33, the rollers 18 and 20 are activated by the application of RF energy thereto to effect the formation of a permanent, fluid tight seal 100 in the tubing wall portions then gripped firmly therebetween, with resultant formation of a sealed tubing section volume V, having respective and substantially uncontaminated predetermined quantities of sample, reagent and air contained and mixed therewithin, all as illustrated in FIG. 7.

Operation of the apparatus of the invention is, of course, continuous as described with the sample quantities from each of the succeeding sample containers being mixed and sealed in turn with like predetermined reagent and air volumes in successive, spaced sealed volumes of the tubing 12. Thus, the next cycle of operation would be commenced by the advancement of the tubing to advance the seal 100 beyond sealing jaws 26 and 28 whereupon the tubing would again be stopped and said sealing jaws moved and activated as described to commence the formation of a new seal 30′ having passages 36′ and 38′. Following this, the next succeeding sample container 40′ would be advanced to the position of FIG. 2 to commence injection of said next succeeding sample into the newly formed and soon to be expanded tubing section volume V′. Operation would then continue until all of the sample containers have been evacuated. Reagent container 72 will, of course, be utilized for reagent injection as described into each of the formed tubing section volumes through appropriate control of the reagent container supply means 86.

Utilization of the method and apparatus of the invention for the automatic separation of the lymphocytes from a series of whole blood samples on a continuous flow basis through use of the methodology disclosed in my United States Pat. 3,709,791 issued on Jan. 9, 1973 and assigned to the assignee hereof is illustrated in generally schematic manner in FIG. 8. For such use, it may be understood that the "reagent" in container 72 would be constituted by a separating agent containing the following constituents to form a whole blood sample-separating agent mixture in the manner described in detail hereinbelow:

(a) Magnetic particles such as carbonyl iron particles, ferrite particles or magnetite particles in the size range of one to four microns which function, following the sensitizing thereof as described in detail hereinbelow, to effect the tagging of the phagocytic leukocytes and enable the subsequent magnetic sweeping thereof from the erythrocytes, blood plasma and lymphocytes with minimum entrapment of the latter.

(b) Magnesium and calcium free ions in the form of dissolved salts of calcium chloride and magnesium chloride which function to restore the ionic content of the "EDTA blood" to its original value by the replacement of the positive free ions bound as described hereinabove by EDTA to thereby provide an optimum ionic concentration for leukoadhesion and phagocytosis.

(c) A minimum amount of a suitable anti-coagulant in the nature of heparin to insure the prevention of blood sample clotting during the time required for the lymphocyte separation process.

(d) A sensitizing agent comprising positively charged molecules of, for example, a basic poly amino acid or polypeptide in the nature of poly L lysine, polybrene, poly D lysine, poly DL lysine, or polyarginine or the like to enhance leukoadhesion and phagocytosis by sensitizing or increasing the positive surface charge on said magnetic particles through adsorption thereto.

(e) A dextrose solution to provide energy for the phagocytosis process.

(f) An isotonic solution in the nature of Hanks BSS of the osmatic pressure of blood plasma to provide a physiological solution medium for the separation process.

(g) A red cell sedimenting agent comprising a high molecular weight settling agent in the nature, for example, of Dextran, Ficoll, PHA or the like in combination with, for example, a small amount of the monosodium or disodium salts of EDTA to promote erythrocyte sedimentation by causing the same to aggregate and thus fall more readily to the bottom of the mixture stream.

The separation of the lymphocytes from the whole blood sample is effected by the incubation of the resultant whole blood sample-separating agent mixture to promote phagocytic leukocyte tagging by the sensitized magnetic particles, to the substantial exclusion of the lymphocytes, through leukoadhesion, phagocytosis and clumping, respectively, the aggregation, settling and removal of the major portion of the erythrocytes, and the subsequent magnetic sweeping of the thusly tagged phagocytic leukocytes, and the majority of the platelets from the whole blood sample.

The exact manners in which leukoadhesion, phagocytosis and leukocyte clumping take place are shown and described in detail in the United States Pat. 3,200,555 issued Oct. 24, 1972, and assigned to the assignee hereof.

Each of the whole blood samples of interest would be placed in a different sample container and would be premixed therein with a predetermined measured quantity of a suitable physiological stabilizer and anti-coagulent in the nature of the disodium or tripotassium salts of the chelating agent EDTA, to result in the substantially immediate formation of what may be termed "EDTA blood" to physiologically stabilize the white blood cells or leukocytes of the whole blood sample and prevent clotting of the red blood cells or erythrocytes to very significant advantage.

Following the introduction of the blood sample and separating agent into the tubing and the formation of the sealed tubing volume V is depicted in FIG. 8, the tubing 12 is advanced in helical manner by a rotating drum 105 through mixing and incubation or treatment means 106 to effect incubation. Preferably, the incubation temperature will be about 37° C. and the transit time of the sealed tubing volume V of interest through means 106 will be about 30 minutes.

Following this, the tubing will be advanced around drive roller 108 for generally vertical movement to and around drive roller 110. This vertical movement functions to effect erythrocyte or red cell sedimentation to the lower portion of the tubing volume V. Just before the latter reaches drive roller 110, tubing advancement is momentarily halted, and sealing means 112, which comprise RF energizable sealing jaws 114 and 116, are actuated to form a seal 118 in the tubing volume V at a location predetermined to generally coincide with the upper level of the sedimented erythrocytes to thus seal the latter off from the tubing volume V in the newly formed sealed tubing volume VI.

Advancement of the now divided tubing volumes V and VI is then continued around drive roller 110 to magnetic separator means 120 which, as best seen in FIG. 9, comprise spaced, high field density magnets 122 and 124 which are operable to generate a generally arcuate, high gradient magnetic field which extends in part as shown through the tubing 12.

As the tubing volume V is advanced through the magnetic separator 120, it may be understood the magnetic particles, and the phagocytic leukocytes which have been tagged thereby to the substantial exclusion of the lymphocytes of interest, will be subjected to the high density magnetic field and will be substantially retained and/or shifted thereby to the rearward portion of the tubing volume V adjacent the seal 118, all as indicated at 126 in FIG. 8.

As a result, the substantial majority of the lymphocytes of interest, as suspended in the plasma, will be moved with the tubing 12 for accumulation in the portion of the volume V of the latter generally adjacent the seal 30.

Just as the section of interest of the tubing 12 reaches the location thereof depicted in FIG. 8 relative to the magnetic separator means 120, it may be understood that advancement of the former is again momentarily discontinued and sealing means 130, which comprise moveable, RF energizable sealing jaws 132 and 134, are energized and actuated to move into the depicted positions thereof to grasp the tubing firmly therebetween and form a seal 136. As a result, a sealed, sterile tubing volume V2 will beformed and will contain a substantial majority of the lymphocytes, with minor erythrocyte and platelet contamination, from the blood sample of interest as suspended in the dilute autologus plasma from the latter, and it is believed clear that the essential antigenic properties of the lymphocytes will remain substantially undisturbed by the separation process. This sealed, sterile tubing volume V2 may then be advanced beyond the drive rollers 138 and 140 and then readily separated from the tubing 12 by simple cutting midway through the tubing seals 30 and 136. Removal of the thusly separated lymphocytes from the sterile tubing volume V2 may, of course, be readily effected as and when desired in any appropriate manner.

Utilization of this basic lymphocyte separation methodology on a semi-automated basis as described in the above mentioned United States Pat. 3,709,791 has proven capable of providing for lymphocyte separation with a combination of, on the average, approximately 95% purity, 80% yield, and 99% viability, whereby may be readily understood by those skilled in this art that the lymphocytes contained in the sterile tubing volume V2 may be used to significant advantage in a very wide variety of diagnostic and therapeutic applications with regard to the blood sample donor. Too, since the separated lymphocytes are provided as described in a sealed, sterile, tubing volume, donor identification, storage and/or transportation thereof under appropriate conditions is greatly facilitated. In addition, the fact that the sedimented erythrocytes, and the large majority of the tagged phagocytic leukocytes are provided as described in the respective sealed sterile tubing volumes VI and V will render the same readily available for analysis as desired, and will also greatly facilitate the donor identification, storage and/or transporation thereof.

An embodiment of the method and apparatus of the invention wherein the tubing seals are pre-formed at equally spaced intervals in the sterilized tubing 12 is illustrated in FIGS. 10–13. As a result of this seal pre-formation, the drive roller 18 and idler roller 20 will be spaced apart as shown a distance which is almost equal to the outer diameter of the tubing 12 and the respective active surfaces of said rollers preferably finished in a suitably high-friction mode, and/or formed with substantial concavity as illustrated in FIG. 11, to enable drive of the tubing without damage to said pre-formed seals. Since said seals are pre-formed, elimination of the sealing means 24 is, of course, made possible. Too, this embodiment illustrates the possibility of sample and reagent pre-mixture and concomitant introduction into the tubing volume thus enabling the elimination of the entire independent reagent supply means.

More specifically, and as seen in FIG. 10, two part seals 142 comprising seal portions 144 and 146 which form a still sealed passage 148 extending therebetween, and imperforate seals 150, are pre-formed at equally spaced intervals in the tubing 12 to define spaced tubing volumes V of substantially equal volumes therebetween. In addition, each of said tubing volumes is vented to atmosphere by the formation of a very small vent 152 therein to provide for the exhaust of air therefrom for purposes described in detail hereinbelow, and it may be understood that the presterilization of the tubing 12, the storage thereof in clean air chamber 16, and the very small size of the puncture 152 will combine to substantially inhibit any contamination of the tubing volume V by virture of said puncture.

In the embodiment of FIG. 10, each of the sample containers 40 takes the form of a sterile, disposable syringe which comprises a calibrated, transparent body part 154, a round-ended plunger 156 and a hypodermic needle 158 extending therefrom. Each syringe is slidably disposed in a sample container support collar 66 of the sample container supply means 54, and is biased downwardly therein by a tension spring 67.

For use with sample containers 40 taking the form of disposable syringes, the operative surface 70 of the drive cam 68 will be configured as shown to rise substantially linearly from a minimum level to a maximum level throughout the distance D.

In operation, predetermined quantities of a different sample and the reagent will be drawn into each of the disposable syringes through appropriate manipulation of the syringe plungers 156 in the sterile manner described in the above mentioned United States Pat. 3,709,791. Following this, each of the syringes with the respective syringe plungers 156 in the withdrawn positions thereof, is disposed as described in a different one of the sample container support collars 66. Concomitant advancement of the tubing 12 and sample container supply means 54 is then effected with the result that as each withdrawn syringe plunger 156 is brought into contact with cam surface 70, the syringe will be driven upwardly in collar 66 with resultant puncture of the tubing 12 by hypodermic needle 158 through the tubing wall of seal passage 148. Continued advancement of the syringe and tubing will result in the pumping of the sample-reagent mixture into the tubing volume V due to the fact that the plunger 156 continues to be forced upwardly by the drive cam surface. As the sample-reagent mixture of interest is pumped into the tubing volume V, the air displaced thereby will simply exhaust to atmosphere through the small vent 152.

The sample-reagent mixture introduction operation continues as described until the plunger 156 has been advanced just beyond the abrupt drop-off in the cam surface 70, at which point the combined effects of gravity and the biasing means 67 will be effective to move the syringe downwardly to remove the hypodermic needle 158 from seal passage 148. Shortly thereafter, tubing advancement is momentarily discontinued and sealing means 160, which comprise RF energizable sealing jaw 164 and 166 are actuated and energized to seal passage 148 and vent 152 to thus complete the formation of the sealed tubing volume V containing the predetermined mixed quantities of sample and reagent therein. Operation is, of course, again continuous as described until predetermined quantities of the sample-reagent mixture from each of the syringes on sample container supply means 54 has been introduced into and sealed in a different sterile tubing volume V. In the event that independent reagent introduction into the respective tubing volumes V is desired, it is believed clear that reagent supply means in the nature of reagent container 72 and reagent container supply means 86 (FIG. 4) could be employed in the embodiment of FIG. 10 although, in such instance, means to positively pump the reagent into the tubing volumes would, of course, be required.

Figure 13:
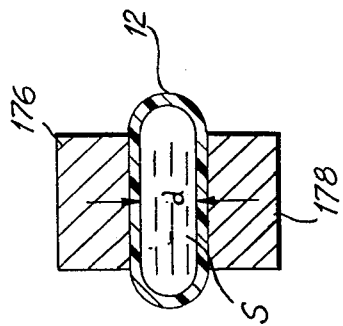
FIG. 13 is a cross-sectional view taken along line 13—13 in FIG. 12.
Figure 12:
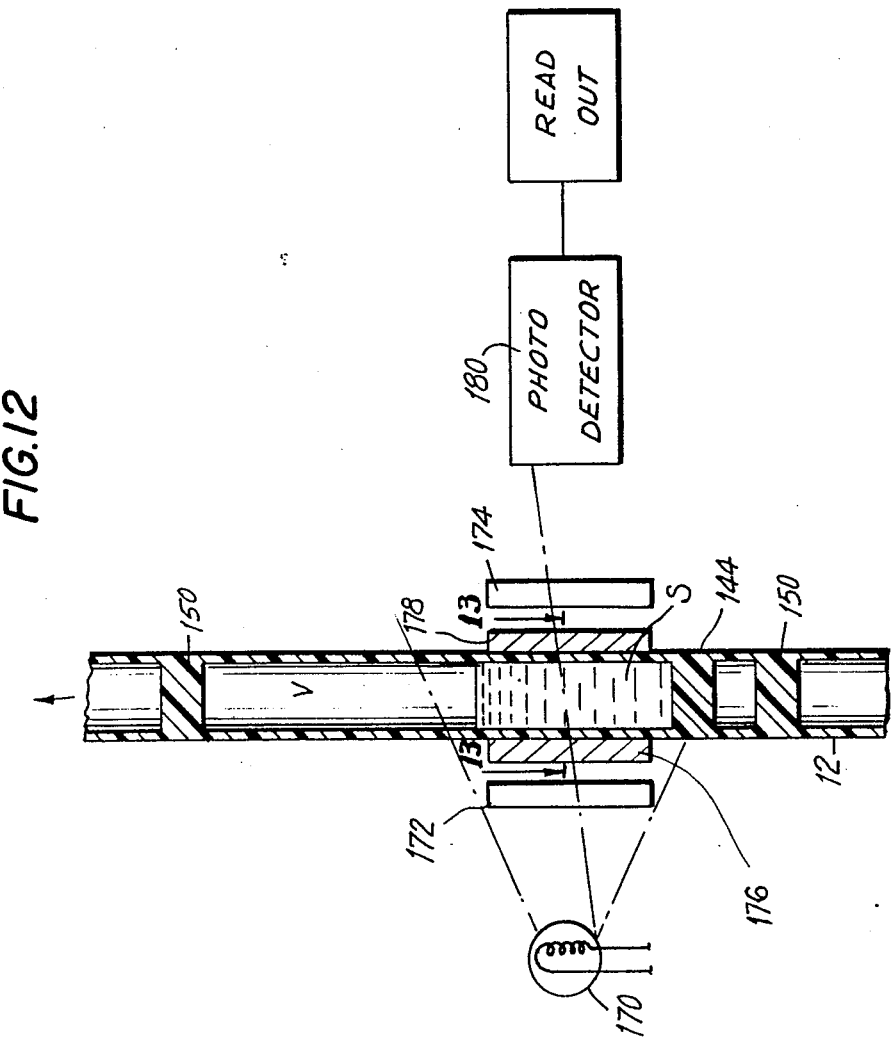
FIG. 12 is a partially schematic, cross-sectional view illustrating the utilization of the tubing to form the flow cell of colorimeter means.

Although described hereinabove by way of illustration as applied to the separation of lymphocytes from whole blood samples, it is believed clear that the method and apparatus of the invention would be applicable to other and different types of sample analysis. Thus, for example, for the quanitative analysis of a series of blood samples with regard to one or more constituents thereof through colorimetric techniques, it may be understood that the reagent used would be a suitable color-producing reagent, and that each of the sealed, sterile tubing volumes V containing a suitably reacted sample-reagent mixture could be advanced in turn through suitable colorimetric means for quantitative sample analysis. More specifically, and as illustrated schematically in FIG. 12 wherein a light source is indicated at 170, suitable optical filters at 172 and 174, focussing lenses at 176 and 178, and photo-detector means at 180, each tubing volume V is generally vertically oriented and the advancement thereof temporarily halted with the tubing volume V positioned as depicted in such manner that the sample-reagent mixture of interest fills the tubing volume portion between the focussing lenses 176 and 178. Said lenses may be shaped in the manner depicted in FIG. 13 to provide an efficient optical interface between the same and the walls of the tubing 12. As a result, it may be seen that said tubing volume portion in essence, when the lenses 176 and 178 are positioned as in FIG. 13 by appropriate structude, not shown, forms the flow cell of the colorimeter having an optical path of distance $d$, and that colorimetric analysis of the sample-reagent mixture S may readily be effected by determination of the amount of light absorbed thereby as should be obvious. The inner faces of the focussing lens 176 and 178 are parallel, as depicted in FIG. 13, to provide an efficient optical interface between the same and the walls of the tubing 12.

While there has been shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. Apparatus for the successive mixing of a series of samples with a reagent without inter-sample contamination comprising, elongated tubing means, means for moving said tubing means along a path, means disposed along said path for successively sealing said tubing means at spaced points thereon to form successive, spaced sealed tubing volumes which are isolated each from the other, means for puncturing said tubing means volumes, and means for supplying predetermined sample and reagent quantities into said tubing means volumes during the formation thereof and through punctures defined therein to result in spaced tubing means volumes each containing a sample-reagent mixture, said tubing means moving means and said means to form said spaced tubing means seals being cooperatively effective to expand said tubing means volumes during the formation thereof whereby said sample and reagent quantities may be drawn thereinto through said punctures during the tubing means volume formation.

2. Apparatus as in claim 1 further comprising, means to seal said punctures following sample and reagent quantity supply to said tubing means volumes.

3. A method for the successive mixing of a series of samples and a reagent without inter-sample contamination comprising, moving elongated tubing means along a path, successively sealing said tubing means by sealing means disposed along said path at spaced points to form successive, spaced sealed tubing volumes which are isolated, each from the other, puncturing said tubing means volumes, supplying predetermined sample and reagent quantities into said tubing means volumes during the formation thereof and through punctures defined therein to result in spaced tubing means volumes each containing a sample-reagent mixture, and expanding said tubing means volumes during the formation thereof whereby, said sample and reagent quantities are drawn thereinto through said punctures during tubing means volume formation.

4. A method as in claim 3, further comprising the step of sealing said punctures following the supplying of said sample and reagent quantities into said selected tubing means volumes.

References Cited
UNITED STATES PATENTS

| | | | |
|---|---|---|---|
| 3,342,019 | 9/1967 | Smythe | 23—253 RX |
| 3,579,303 | 5/1971 | Pickering | 23—259 X |
| 3,607,097 | 9/1971 | Auphan et al. | 23—259 |

ROBERT M. REESE, Primary Examiner

U.S. Cl. X.R.

141—1, 65, 83, 329; 53—180; 23—253 R